United States Patent Office 3,506,040
Patented Apr. 14, 1970

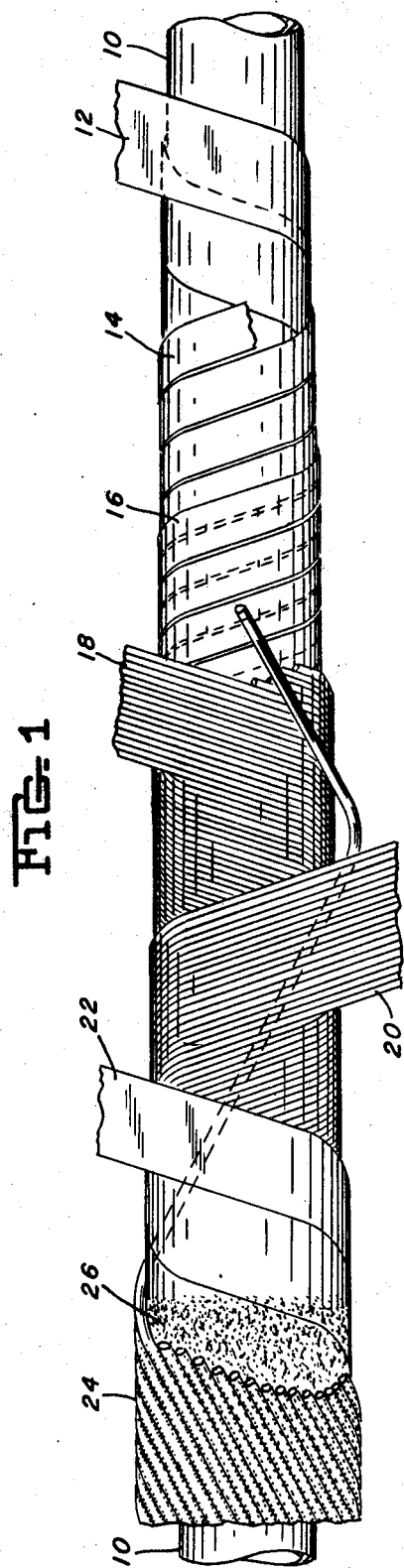
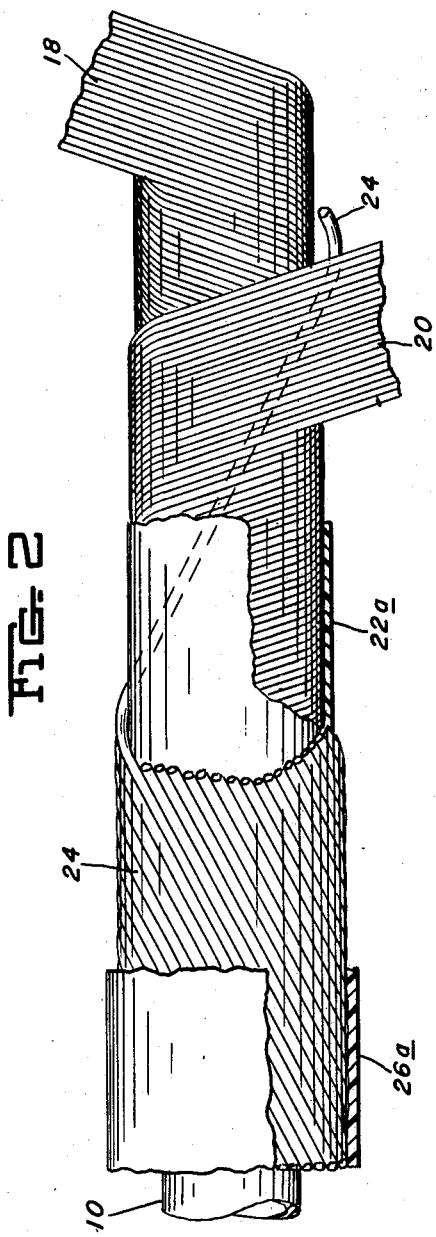
INVENTORS.
WALTER O. EVERLING &
JOHN A. FREY
Attorney

3,506,040
ARMORED HOSE
Walter O. Everling, Cleveland, Ohio, and John A. Frey, McCandless Township, Allegheny County, Pa., assignors to United States Steel Corporation, a corporation of Delaware
Filed Nov. 14, 1968, Ser. No. 775,734
Int. Cl. F16l 11/14
U.S. Cl. 138—130                                    15 Claims

ABSTRACT OF THE DISCLOSURE

A flexible, armored hose for high-pressure oil and gas service comprising successive concentric plies wound on a plastic tube. Firstly, two plies of spring-steel strip, wound on the same hand, the outer ply overlapping the spaces between convolutions of the inner ply. Then, at least one ply of wire and, of opposite hand, a ply of armor wire. For severe off-short well service the hose may include a ply of bedding tape between tube and strip, a ply of water-impervious, gas-pervious material between the wire and armor-wire plies and corrosion-resistant protection for the armor wire.

BACKGROUND OF THE INVENTION

Field of the invention

This invention relates to a flexible armored hose for high-pressure oil and gas service that may be reeled on and off a reel or drum. More particularly, the invention relates to high-pressure, reelable hose or pipe lines of relatively large internal diameter, for off-shore oil and gas transmission systems. Such lines must be light and flexible, yet must withstand high hoop stresses, axial loads, and external hydrostatic pressure under various internal pressure loadings, from one atmosphere upwards. The hose must resist abrasion and corrosion and must not fray when cut.

Description of the prior art

It is known for example, according to Haas Patent No. 3,212,528, dated Oct. 19, 1965, to produce on mandrels, flexible, wire-reinforced rubber hose, especially suited for high-pressure hydraulic systems. The inner tube of rubber or synthetic material may be reinforced with braided wires or with a plurality of wire plies disposed in helical convolutions about the inner tube, under tension to impart the requisite burst resistance and to prevent flaring when the hose is cut. The successive wire plies are usually of opposite hand and are separated from each other by rubber or rubber-treated fabric, plastics or other flexible material. Among the disadvantages of such hose are a limitation in the length thereof to the mandrel length. Such hose is available only with inner tubes of relatively small internal diameter, for example, ½″ or ¾″ to handle working pressures of 3000 p.s.i., or more. Exuding of the inner tube between the wire convolutions due to the tension wrap and even more so at high working pressures leads to early inner tube failure when the hose is flexed or moved often, for example, in off-shore applications. Hence, it is one of the objects of our invention to provide high-pressure hose in continuous lengths of 10,000 feet, or more, and having internal diameters of 2″, or more. While suitable for on-shore use, our hose is particularly suitable for off-shore transmission lines for oil and gas.

SUMMARY OF THE INVENTION

According to our invention we substitute two overlapping plies of metal strip for the wire plies previously used. Each ply may be formed of one, two, three or more lengths of strips, preferably two lengths. When a plurality of lengths are provided, they are preferably wound simultaneously with the convolutions of one length parallel to the convolutions of the others. In each case, each ply has a plurality of helical convolutions with a narrow space between adjacent convolutions. The two plies are wound on the same hand and pitch, with the convolutions of the outer ply overlapping the space between adjacent convolutions in the inner ply. The metal strip provides a smooth, flat surface against which the inner tube bears under operation pressures. At least one concentric ply of high tensile strength wire helically wound on the strip provides hoop or bursting strength, torsional rigidity and resistance to crushing. A concentric ply of armor wire is helically wound on the wire ply at a pitch of between about six and eight times the outside diameter of the hose, prior to applying the armor-wire ply. This imparts the necessary tensile strength and protection against mechanical abrasion. The described hose structure is suitable for use in hydraulic systems and the like. For use in off-shore systems, it is preferred because of the surrounding environment, to provide greater protection against abrasion and corrosion. A ply of bedding tape between the tube and strip provides added protection for the tube against cutting and abrading by the strip during excessive flexing of the hose. A ply of water-impervious, gas-pervious material between the wire and armor-wire plies provides protection against sea-water corrosion and avoids gas-pressure build-up under this ply. The armor-wire ply may be protected against corrosion by a plastic sleeve thereover or by being laid in a corrosion-resistant mix.

BRIEF DESCRIPTION OF THE DRAWINGS

A complete understanding of the invention may be obtained from the following detailed description and explanation which refer to the accompanying drawings illustrating the present preferred embodiments. In the drawings:

FIGURE 1 shows a hose construction made in accordance with this invention, the component portions of the hose cover being broken away progressively to illustrate the nature of the several components; and FIGURE 2 is a view, similar to FIGURE 1, showing a second embodiment of our invention.

DESCRIPTION OF THE PREFERRED EMBODIMENT

Referring to the drawings, more particularly to FIGURE 1, there is shown the preferred hose construction for the severest service a hose may encounter. In FIGURE 1, the hose structure includes a tube 10 surrounded by a multi-ply reinforcing wall. For oil, chemical and gas service, for example, the tube material should be impervious to these materials and have low permeability to gases, more particularly, to methane and hydrogen. The tube material should be abrasion resistant, yet sufficiently flexible for a hose having, for example, a 2″ ID tube, to be bent around a 6 foot diameter drum, without cracking or serious distortion. For this service, tube 10 is preferably made of a thermoplastic material such as a vinyl resin, particularly polyvinyl chloride or ethylenevinyl acetate copolymers.

A concentric ply 12 of bedding tape is wound on tube 10 in parallel helical convolutions or the convolutions may overlap between 0% and 35% of the width of the tape. In FIGURE 1, the overlap of prior convolutions is about 20%. The bedding tape may be cotton or synthetic fibers, preferably impregnated with a self-vulcanizing or synthetic material that does not require curing. For less severe service the bedding tape may be omitted.

A concentric ply 14 of metal strip is helically wound on tape 12 but of opposite hand to tape 12. In this so-called inner bridging ply, the spacing between convolutions must be such as to permit any required flexing of the hose. The spacing may be between about 0.020" and 0.150", preferably between about 0.070" and 0.10" to provide between about 93% and 98% coverage of the underlying surface. The lengths of strip may have a width between about ¾" and 1½", preferably between about 1" and 1¼". The strips are preferably of tempered spring steel, having rounded edges and a minimum tensile strength of about 175,000 pounds per square inch (p.s.i.) or 175K s.i., and a minimum uniform elongation of about 3%. The strip has the standard tolerances.

A concentric ply 16 of metal strip is helically wound on strip ply 14 of the same pitch and of the same hand, except that each convolution of radially outer ply 16 overlaps the narrow space between each adjacent convolution in the radially inner ply 14. The above-described specifications for ply 14 are equally applicable to ply 16. The bridging plies and, more particularly, the radial inner ply, provide a smooth and practically continuous surface against which tube 10 and tape 12 may bear, under operating pressures of 3000 p.s.i. and more. Any extrusion of tube 10 and tape 12 into the spaces between strip 14 convolutions is prevented from going therebeyond by the overlap of ply 16. The latter overlap should be sufficient to cover said openings under all operating conditions.

At least one concentric ply 18 of metal wire is helically wound on strip ply 16. A mutually concentric wire ply 20 of opposite hand is preferably helically wound on wire ply 18. Ply 20 provides a balanced construction and also additional hoop strength, if desired, while still using wire having reasonably high tensile strength and flexibility. For good flexibility under operating conditions, the spacing between convolutions should provide between about 94% and 97% coverage of the underlying ply, preferably a maximum of about 96%. For a single ply, the diameter of the wire may be between about 0.035" and 0.100", preferably between about 0.040" and 0.090". To provide the necessary bursting or hoop strength under the above varying pressure and flexing conditions, as well as providing torsional rigidity and resistance to crushing with, for example, zero pressure in tube 10, the wire in a ply should be of high strength, between about 200K s.i. and 270K s.i., preferably between about 215K s.i. and 240K s.i. A wire ply may comprise helical convolutions of a single wire although it is preferred to wind a multiplicity of wires simultaneously.

A concentric ply 22 of water-impervious material is helically wound on wire ply 18 or 20 to prevent water from coming into contact with said wire and strip plies with resultant corrosion thereof. The material should have a relatively high permeability to gases, such as to methane and hydrogen, when the armored hose transmits gases. The permeability should be greater than that of tube 10 to prevent the gas from accumulating and building up pressure between tube 10 and ply 22. For this service the water barrier ply is preferably made of a self-vulcanizing material, for example, neoprene or polyethylene. Where tube 10 is made of polyvinyl chloride (PVC), neoprene and polyethylene, respectively, have about four and two times the permeability of PVC to methane and hydrogen. The material may be a tape, for example, a laminate of fiber glass or other flexible material impregnated with a self-vulcanizing material sandwiched between two neoprene or polyethylene tapes. Ply 22 may comprise between one and three plies or layers of tape in parallel helical convolutions or the convolutions may overlap, more particularly, when a single layer is used. For less severe service ply 22 may be omitted.

A concentric ply 24 of metal armor wire is helically wound on either ply 18, 20 or 22, depending on the hose structure. The tensile strength of armor-wire ply 24 is wound of opposite hand to the wire ply therebelow. This is essential where only a single wire ply 18 is used, to prevent excessive uni-directional torque in the hose structure. Then tensile strength of armor-wire ply 24 must be sufficient to support the weight (axial load) of the hose structure over any required length and the tensile stress built up in the hose when operating over the required pressure range. For example, for each 2 p.s.i. of radial bursting stress (operating pressure) there is created about 1 p.s.i. of tensile stress. Ply 24 comprises a multiplicity of wires wound simultaneously. The diameter of the armor wire may be between about 0.125" and 0.300", preferably between about 0.150" and 0.225". The pitch of each helical convolution may be between about 3 and 10 times, preferably between about 6 and 8 times the outside diameter of the hose prior to applying ply 24. A corrosion-protection ply 26 made of corrosion-resistant material is used to protect armor-wire ply 24 from corrosion and abrasion. As shown in FIGURE 1 this material may comprise natural or synthetic products, for example, a layer of asphalt and whiting applied to ply 22 and sufficient to cover ply 24. For less severe service ply 26 may be omitted.

It is preferred that the steel-reinforcing plies 14, 16, 18, 20 and 24 be performed, at the time of application, to a diameter which is less than that upon which they are wound helically. Such preforming causes hugging or clinging of the convolutions to the underlying plies and thus provides a "dead" or inert hose structure. This results in easier handling, for example, for reeling on or off a drum, and eliminates objectionable flaring of the ply ends at a severance plane. The pitch of the convolutions of armor-wire ply 24 has been described. The pitch of all the convolutions therebelow is preferably much smaller. Referring to FIGURE 2 of the drawings, there are shown other embodiments of the invention wherein the water-impervious material is shown as an extruded ply 22a and the corrosion-resistant material is shown as an extruded ply 26a.

As an example of a specific construction, a hose having all the plies as described in FIGURE 1 is made with a polyvinyl chloride tube 10 of 2" internal diameter (ID) and 2.250" outer diameter (OD). Ply 12 consists of neoprene-impregnated cotton fabric, 2" wide and 0.015" thick. The convolutions are abutted and at an angle of 16°29' to a normal hose radius. Plies 14 and 16 of even hand, respectively, consist of 2 strips wound simultaneously. Each strip is 1" wide and 0.010" thick. It is made of scaleless, tempered, 0.68 to 0.80 carbon, spring steel with rounded edges and having a tensile strength of 200K s.i., a minimum, uniform, elongation of about 3% and standard tolerances. The spacing between parallel helical convolutions is approximately 0.100" providing about 96% coverage. The centerlines of ply 16 coincide approximately with the spaces between convolutions of ply 14. Plies 18 and 20 are of opposite hand and respectively consist of 24 wires wound simultaneously. Each round wire has a 0.080" diameter and is made of hard drawn spring wire, Border and Brace grade, tensile strength of about 225K s.i. The spacing between adjacent convolutions, provides a covering efficiency of about 96%. Ply 22 comprises a laminate of two neoprene tapes with a neoprene-coated woven fiber glass tape therebetween. The laminate is 1.750" wide and 0.030" thick. Ply 22 consists of three layers of abutted tape, of alternate lay, wrapped in parallel helical convolutions. The convolutions of the third, radially outer layer are at an angle of 13°29' to a normal, hose radius. A heavy layer of a mixture of asphalt and whiting is applied to ply 22 as ply 26. Laid in and covered by ply 26, ply 24 consists of 48 wires wound simultaneously of opposite hand to the convolutions of ply 20. The convolutions are wound at a pitch of about 7 times the outside diameter of ply 22, the latter being about 2.86". Each armor wire has a 0.165" diameter and is made of electro-galvanized hard basic wire (Class C). All of the steel reinforcing plies are preformed so that they hug the underlying plies.

The completed hose having an OD of about 3.21" is supplied on a six-foot diameter cable-type reel. The completed hose is designed for a working pressure of about 3000 p.s.i. and is capable of sustaining pressures up to about 9000 p.s.i. and axial loads up to about 60,000 lbs. without bursting. At zero internal pressure the completed hose can sustain up to about 500 p.s.i. external pressure and 60,000 lbs. axial load without collapsing.

Under operating pressures which may vary, for example, between about 3000 and 10,000 p.s.i., the use of strip plies 14 and 16 have given unexpectedly better results than prior art plies of wire. The latter provide only line contact, the extrusion of tube 10 and tape 12 between each convolution of wire resulting in distortion of the tube wall. Hence, there are created points of weakness therein, with resultant premature failure of the tube wall. As previously described, one or more wire plies are wound on the radial outer strip ply. The latter's smooth surface permits a wire ply much more freedom to slide axially relative to tube 10 than would a wire ply 16, when a hose is flexed or bent or under varying pressure conditions. This has been found to result in longer hose life under severe operating conditions.

While the above example illustrates one preferred embodiment of our invention, it will be apparent that modifications can be made in accordance with the teachings of our specification. Thus, protective plies 12, 22 and 26 may be eliminated for on-shore use of our armored hose. The protective extrusions 22a and 26a shown in FIGURE 2 may be used rather than the described plies 22 and 26. Proper adjustment of wire and strip sizes and arrangements, plus choice of appropriate mechanical property values would make possible constructions for higher operating pressures and larger or smaller diameter hoses.

The invention is characterized by several distinct advantages. In the first place, it provides a flexible, reelable, large-capacity hose for high-pressure use by means of a novel combination of reinforcement by strip and wire.

Secondly, it provides a hose for off-shore use in oil and gas distribution that is protected against abrasion, corrosion and build-up of internal gas pressure by a novel combination of protective plies.

Thirdly, it provides a hose in continuous, long lengths. A continuous hose can be made to any required length by applying the reinforcing plies to the same length, for example, of an extruded plastic inner tube. This is in contrast to prior art high-pressure hose manufactured on mandrels having a maximum length of about 200 feet. It is evident the saving in couplings is also appreciable when following the teachings of our invention.

Lastly, it provides a hose for off-shore use that lasts longer in service, withstands high hoop stresses, axial loads and external hydrostatic pressure under various internal pressure loadings and can be recovered for use elsewhere when no longer needed.

Although we have disclosed here in the preferred practice of our invention, we intend to cover as well any change or modification therein which may be made without departing from the spirit and scope of the invention.

We claim:

1. A flexible hose comprising a flexible tube, a first ply of metal strip helically wound on said tube with a narrow space between adjacent convolutions, a second ply of metal strip helically wound on said first strip with a narrow space between adjacent convolutions, the two plies being wound on the same hand and pitch with the convolutions of the second ply overlapping the space between adjacent convolutions in the first ply, at least one ply of wire helically wound on said second ply and a ply of armor wire helically wound on said wire ply and of opposite hand thereto.

2. A flexible hose as defined in claim 1 wherein the material of said tube is chosen from the group consisting of polyvinyl chloride and ethylene-vinyl acetate copolymers.

3. A flexible hose as defined in claim 1 having a concentric ply of bedding tape helically wound between said tube and said first strip ply.

4. A flexible hose as defined in claim 3 wherein the successive bedding tape convolutions overlap the prior convolutions by between about 0% and 35% of the width of the tape.

5. A flexible hose as defined in claim 1 wherein each ply of metal strip consists of between one and three lengths of spring-steel strip laid parallel to another.

6. A flexible hose as defined in claim 5 wherein said length of strip has a width between ¾" and 1½" and a spacing between convolutions of about 0.020" to 0.150".

7. A flexible hose as defined in claim 1 having two mutually concentric plies of wire, the parallel helical convolutions thereof being of opposite hand and each ply consisting of a multiplicity of individual wires laid parallel to one another.

8. A flexible hose as defined in claim 7 wherein the spacing between adjacent convolutions is such that the wire coverage by each ply is a maximum of about 96% of complete coverage of the underlying surface.

9. A flexible hose as defined in claim 1 having at least one concentric ply of water-impervious material between said wire ply and said armor-wire ply, said material being more pervious to gases than said tube, whereby a gas passing through said tube also passes through said ply of water-impervious material.

10. A flexible hose as defined in claim 9 having between one and three layers of helically wound water-impervious tape said layers being wound of opposite hand to a prior tape layer.

11. A flexible hose as defined in claim 9 wherein said water-impervious material is chosen from the group consisting of neoprene and polyethylene.

12. A flexible hose as defined in claim 1 wherein the helically wound armor wire consists of a multiplicity of individual wires laid parallel to one another and the pitch of each convolution thereof is between about 3 and 10 times the outside diameter of the hose prior to applying the armor-wire ply.

13. A flexible hose as defined in claim 1 having a concentric ply of corrosion-resistant material to protect said armor-wire ply from corrosion.

14. A flexible hose as defined in claim 13 wherein said corrosion-resistant material consists of a mixture of asphalt and whiting, in which said armor-wire ply is laid.

15. A flexible hose as defined in claim 13 wherein said corrosion-resistant material consists of an extruded ply on said armor-wire ply, said extruded ply consisting of a material chosen from the group consisting of neoprene and polyethylene.

References Cited

UNITED STATES PATENTS

| 2,969,812 | 1/1961 | Ganahl | 138—130 |
| 3,212,528 | 10/1965 | Haas | 138—130 |

HENRY S. JAUDON, Primary Examiner

U.S. Cl. X.R.

138—134

UNITED STATES PATENT OFFICE
CERTIFICATE OF CORRECTION

Patent No. 3,506,040  
April 14, 1970

Walter O. Everling et al.

It is certified that error appears in the above identified patent and that said Letters Patent are hereby corrected as shown below:

Column 1, line 19, "off-short" should read -- off-shore --. Column 2, line 9, "operation" should read -- operating --. Column 3, line 70, after "structure" insert -- up to this point --; same line 70, "The tensile strength of" should read -- Usually --; line 74, "Then" should read -- The --. Column 4, line 20, "performed" should read -- preformed --. Column 5, line 55, "here in" should read -- herein --. Column 6, line 14, before "another" insert -- one --.

Signed and sealed this 5th day of January 1971.

(SEAL)  
Attest:

Edward M. Fletcher, Jr.  
Attesting Officer

WILLIAM E. SCHUYLER, JR.  
Commissioner of Patents